United States Patent [19]

Hennessey et al.

[11] 3,798,757

[45] Mar. 26, 1974

[54] MAGNETIC ALIGNMENT METHOD FOR ELECTRIC MACHINE

[75] Inventors: Timothy W. Hennessey, Springfield; Charles A. Lawton, Clark County; Lester W. Buechler, Dayton, all of Ohio

[73] Assignee: Robbins & Meyers, Inc., Springfield, Ohio

[22] Filed: July 29, 1971

[21] Appl. No.: 167,179

[52] U.S. Cl. .................. 29/596, 29/205 R, 29/271, 33/181 R, 310/42, 324/34 EC
[51] Int. Cl. .......................................... H02k 15/00
[58] Field of Search.......... 29/596, 598, 271, 205 R; 310/42; 324/34 EC, 34 PS, 34 D; 33/181 R

[56] References Cited
UNITED STATES PATENTS

| 2,666,892 | 1/1954 | Heidorn | 29/596 UX |
|---|---|---|---|
| 1,687,637 | 10/1928 | Reynders | 324/34 EC |
| 3,426,437 | 2/1969 | Rebhun et al. | 33/174 |
| 3,519,857 | 7/1970 | Plumb | 310/42 |

Primary Examiner—Charles W. Lanham
Assistant Examiner—Carl E. Hall
Attorney, Agent, or Firm—Jacox & Meckstroth

[57] ABSTRACT

Apparatus for accurately magnetically centering a movable member within an annular stator of an electric machine, such as an electric motor or generator or solenoid or the like so that the lateral spacing between the movable member and the stator is magnetically equal at all portions thereof. In one embodiment of the invention, as a rotor within a stator is rotated by energization of the stator, force sensor elements sense the forces which occur laterally between the stator and the rotor. The rotor and the stator are relatively laterally adjusted until the lateral forces between the rotor and the stator are substantially zero. When such lateral forces are substantially zero, the rotor is accurately magnetically positioned with the stator.

10 Claims, 13 Drawing Figures

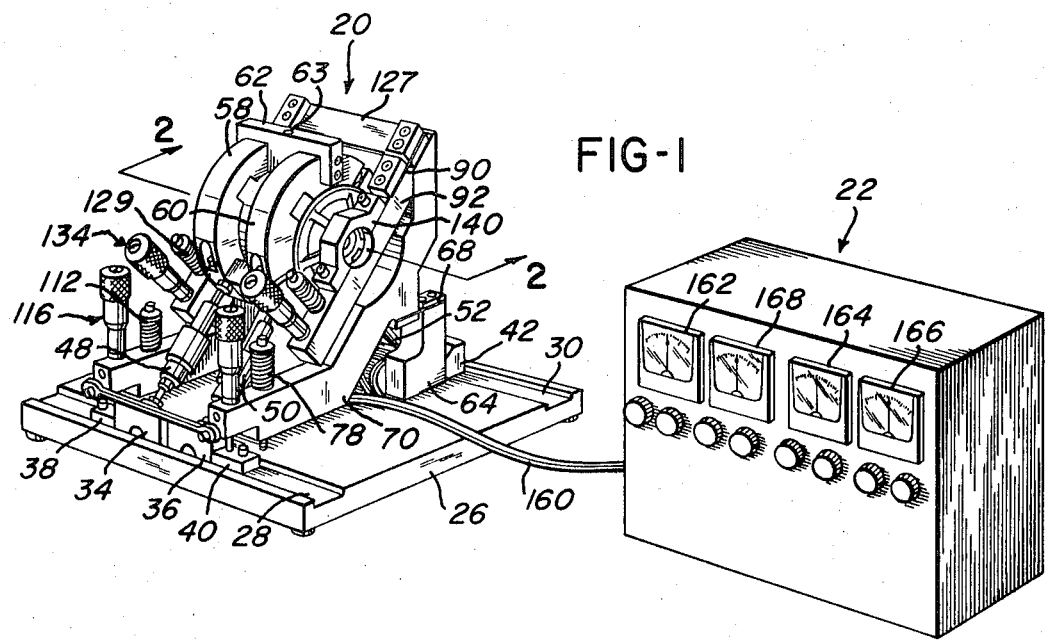

MAGNETIC ALIGNMENT METHOD FOR ELECTRIC MACHINE

BACKGROUND OF THE INVENTION

In the art of electric generators and motors, it is known that best operation is obtained if the rotor is accurately magnetically centered within the stator. If magnetic centering is obtained, minimum noise occurs in the operation of the apparatus. Also, with regard to magnetic centering, other factors may also be considered, such as bearing life, bearing noise and efficiency of operation.

Numerous processes and apparatus have been devised in an attempt to magnetically position a rotor within a stator. However, so far as is known, all of these processes and apparatus are based upon or relate to mechanical or physical centering of a rotor within a stator, in an attempt to obtain magnetic centering of the rotor within the stator. For example, elements such as gauges and the like have been used to determine the spacing between a rotor and stator. Then the position of the rotor within the stator has been fixed in a position at which the rotor is substantially physically centered within the stator. This procedure is known as airgap alignment. However, because of the variations in thickness of wedges, variations in the thickness of coatings of varnish, etc. at the inner surface of the stator and at the outer surface of the rotor, and, in addition, variations in the electrical magnetic components of the machine, a precise airgap alignment between a rotor and stator has not necessarily provided good magnetic alignment therebetween. Thus, the best operation of the motor or generator has not been possible by airgap alignment or other mechanical methods. Therefore, the methods and apparatus related to airgap alignment in an attempt to obtain magnetic alignment of a rotor and a stator have not been satisfactory.

An object of this invention is to provide apparatus and a method by which accurate magnetic centering of a rotor within a stator can be obtained.

Another object of this invention is to provide such apparatus and method which are capable of rapid performance.

Another object of this invention is to provide such apparatus and method which can be automatically employed.

Another object of this invention is to provide means by which a rotary electric machine may be produced at lower cost as a result of employment of the apparatus and method of this invention.

Other objects and advantages reside in the construction of the invention, combinations thereof, the method of manufacture, and the mode of operation, as will become more apparent from the following description.

BRIEF DESCRIPTION OF THE DRAWINGS

FIG. 1 is a perspective view of one embodiment of the alignment apparatus of this invention.

FIG. 2 is an enlarged sectional view, taken substantially on line 2 — 2 of FIG. 1.

DETAILED DESCRIPTION OF THE PREFERRED EMBODIMENT

Figure 3:
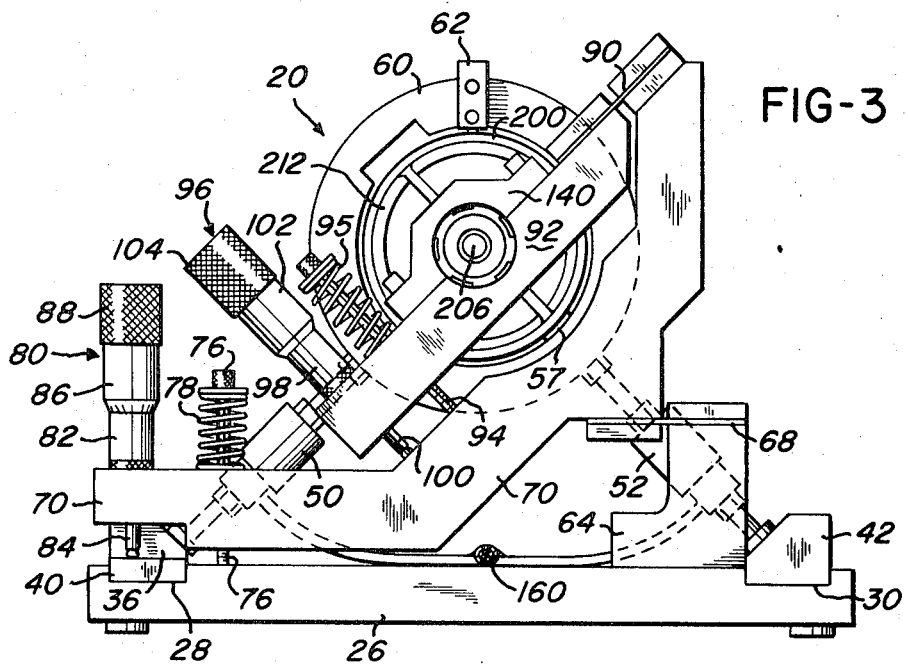
FIG. 3 is a side elevational view, taken substantially on line 3 — 3 of FIG. 2.
Figure 4:
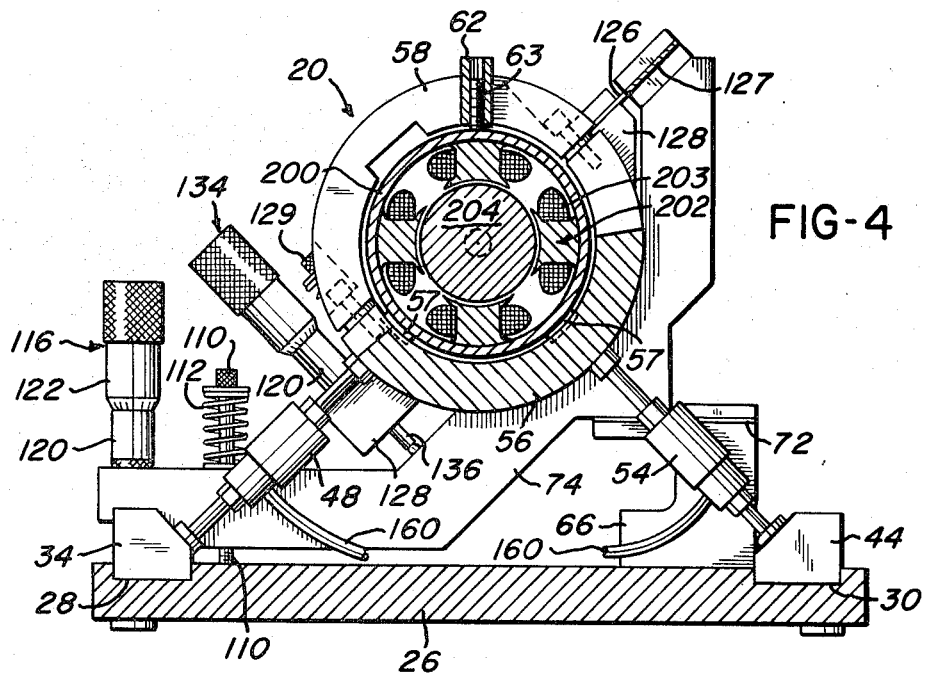
FIG. 4 is a sectional view, taken substantially on line 4 — 4 of FIG. 2.
Figure 5:
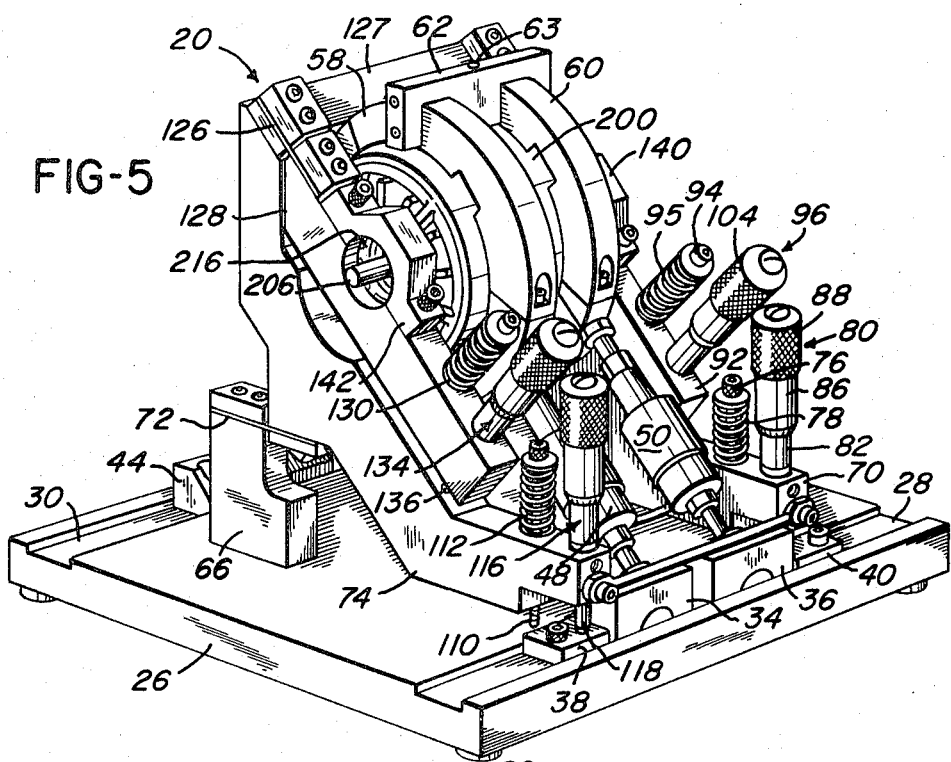
FIG. 5 is a perspective view, drawn on substantially the same scale as FIGS. 2, 3 and 4 showing a portion of the apparatus of this invention.
Figure 6:
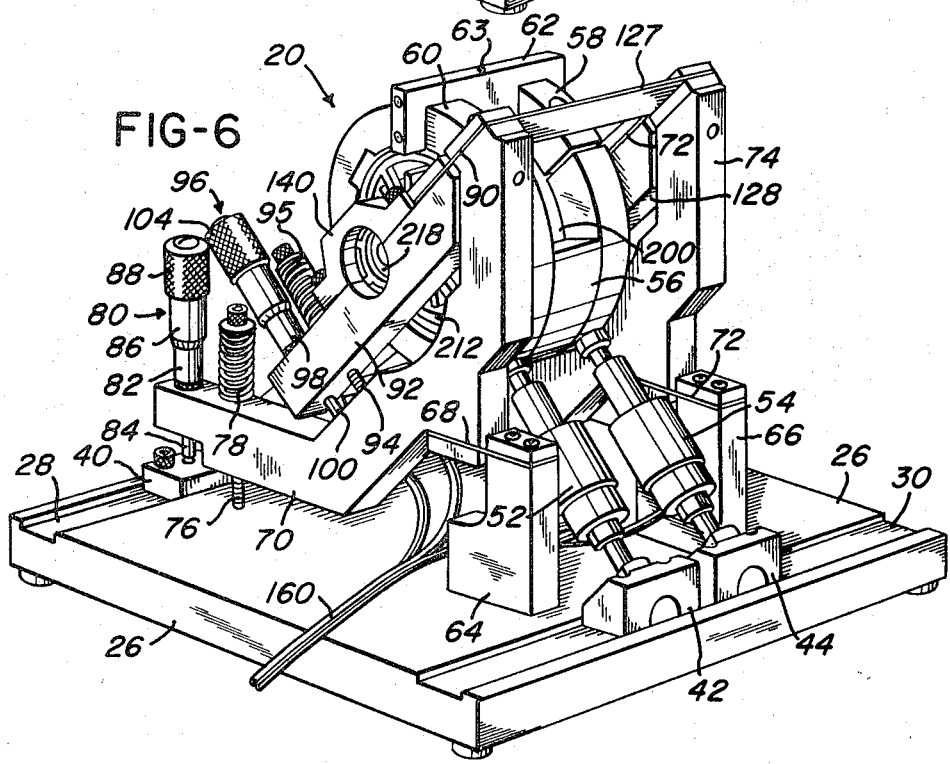
FIG. 6 is a perspective view of the apparatus of FIG. 5 drawn on substantially the same scale as FIG. 5, and taken at a position about 180° from the position at which FIG. 5 was taken.

Apparatus of this invention comprises an adjustment unit 20 and an indicator unit 22.

The adjustment unit 20 includes a base 26 which is provided with a front channel 28 and a rear channel 30. Positioned within the front channel 28 are abutment blocks 34 and 36 which are positioned between rigid pads 38 and 40. Within the rear channel 30 are abutment blocks 42 and 44.

Attached to the abutment block 34 and extending angularly upwardly therefrom is a force sensing device 48. Attached to the abutment block 36 and extending angularly upwardly therefrom is a force sensing device 50. Attached to the abutment block 42 and extending angularly upwardly therefrom is a force sensing device 52. Attached to the abutment block 44 and extending angularly upwardly therefrom is a force sensing device 54. Any suitable force sensing device may be employed as the force sensing devices 48, 50, 52 or 54. For example, a transducer load cell, Model No. BML2-251-200, sold by Transducers, Inc., of Santa Fe Springs, California, has been found to be satisfactory. The force sensing devices 48, 50, 52 and 54 are joined at the upper ends thereof to a lower yoke 56, which is substantially semi-circular.

Upon the upper arcuate surface of the lower yoke 56 and secured thereto are four pads 57, there being one pad 57 in alignment with each of the force sensing devices 48, 50, 52 and 54.

Attached to the lower yoke 56 is an upper yoke 58 and an upper yoke 60 which are spaced apart and which are also substantially semi-circular. A connector member 62 joins the upper yoke 58 to the upper yoke 60. The connector member 62 has an adjustable engagement screw 63 which extends downwardly therefrom.

Adjacent the rear channel 30, in spaced-apart relationship, are a support block 64 and a support block 66. The support block 64 firmly supports a leaf spring 68 which extends therefrom and has attached thereto an arm 70. 72 support block 66 firmly supports a leaf spring ;72 which extends therefrom and has attached thereto an arm 74.

Extending through the arm 70, adjacent the lower portion thereof, and attached to the base 26 is a rod 76 which is encompassed by a helical spring 78, above the arm 70, which engages the arm 70 and urges the arm 70 toward the base 26. The spring 78 resiliently urges the arm 70 downwardly toward the base 26.

Adjacent the rod 76 is a micrometer type adjustment device 80, having a body 82 attached to the arm 70 and a stem 84 extending through the arm 70 and in engagement with the pad 40. The stem 84 is attached to a barrel 86 having a knurled head 88. The barrel 86 is rotatable to adjust the stem 84 with respect to the body 82, thus changing the length of the stem 84 which extends from the arm 70 to the pad 40.

The arm 70 extends upwardly from the leaf spring 68 and at the upper portion of the arm 70 is a leaf spring 90, which is attached to the arm 70 and which extends therefrom and which is attached to an arm 92. The leaf spring 90 and the arm 92 extend angularly downwardly from the upper portion of the arm 70. The lower portion of the arm 92 has a rod 94 extending therethrough and attached to the arm 70.

A helical spring 95 encompasses the upper portion of the rod 94 and is in engagement with the arm 92 and urges the arm 92 toward the arm 70. At a lower portion of the arm 92 is a micrometer type adjustment device 96 which has a body 98 attached to the arm 92 and a stem 100 extending through the arm 92. A barrel 102, having a knurled head 104 is rotatably carried by the body 98 and is attached to the stem 100 for adjustment thereof. Thus, rotative movement of the barrel 102 changes the length of the stem 100 which is disposed between the arm 70 and the arm 92.

The arm 74, which is attached to the leaf spring 72, has at the lower portion thereof a rod 110 which extends through the arm 74 and is attached to the base 26. The upper portion of the rod 110 has an encompassing helical spring 112 which engages the arm 74 and urges the arm 74 toward the base 26.

Adjacent the rod 110 is a micrometer type adjustment device 116 which has a stem 118 in engagement with the pad 38. The adjustment device 116 is similar to the adjustment devices 80 and 96, previously discussed. The adjustment device 116 has a body 120 attached to the arm 74 and a rotatable barrel 122 which is attached to the stem 118 for adjustment thereof.

The arm 74 extends upwardly from the leaf spring 72 and at the upper portion of the arm 74 is a leaf spring 126, which extends therefrom and which is attached to an arm 128. A bar 127 joins the leaf spring 90 to the leaf spring 126. The leaf spring 126 and the arm 128 extend angularly downwardly from the upper portion of the arm 74.

The lower portion of the arm 128 has a rod 129 extending therethrough and attached to the arm 74. A helical spring 130 encompasses the upper portion of the rod 129 and engages the arm 128 and urges the arm 128 toward the arm 74.

At a lower portion of the arm 128 is a micrometer type of adjustment device 134 which is attached to the arm 128 and has a stem 136 which engages the arm 74 for adjustment of the position of the arm 128 with respect to the arm 74.

The arm 92 has attached thereto, at the midportion thereof, a clamp 140, and the arm 128 has attached thereto, at the midportion thereof, a clamp 142.

The lower yoke 56 and the upper yokes 58 and 60 are adapted to retain a housing or frame 200. The housing 200 rests in the lower yoke 56 and on the mounting pads 57 as the engagement screw 63, extending from the connector member 62, engages an opposite portion of the housing 200.

The indicator unit 22 is connected to the force sensing devices 48, 50, 52 and 54 by means of a cable 160. The indicator unit may be any suitable device which is capable of indicating the forces sensed by the force sensing devices 48, 50, 52 and 54. Herein the indicator unit 22 is shown as being provided with indicator instruments 162, 164, 166 and 168, which indicate the forces sensed by the force sensing devices 48, 50, 52 and 54, respectively.

The force sensing devices 48, 50, 52 and 54 may be devices which cause changes in current or voltage in an electrical circuit. Thus, the indicator instruments may be current or voltage responsive instruments.

OPERATION

With the upper yokes 58 and 60 and the connector 62 separated from the lower yoke 56, a housing 200 is positioned upon the pads 57 of the lower yoke 56. The housing 200 is shown as having a stator 202 therewithin provided with windings 203.

The upper yoke members 58 and 60 with the connector member 62 are then attached to the lower yoke 56. The engagement screw 63 is then adjusted downwardly to firmly engage the housing 200.

A rotor 204 within the stator 202 has a shaft 206 rotatably supported by an end bell 210 at one end of the housing 200 and by an end bell 212 at the other end of the housing 200. At this time, the end bells 210 and 212 are free from the housing 200 and preferably out of engagement therewith, as illustrated in FIG. 2. The end bell 210 has a central protuberant portion 216 which is retained by the clamp 142. The end bell 212 has a central protuberant portion 218 which is retained by the clamp 140. As the rotor 204 is supported by the end bells 210 and 212 and by the clamps 142 and 140, the rotor 204 is positioned within the stator 202 so that the rotor 204 is free to rotate within the stator 202.

Due to the fact that the weight of the housing 200 and the stator 202 is sensed by the sensing devices 48, 50, 52 and 54, the weight thereof is indicated by the instruments 162, 164, 166 and 168. Therefore, the first step in the alignment procedure is that of adjusting the instruments 162, 164, 166 and 168 to read zero.

The housing 200, the stator 202, and the rotor 204 may be parts of a motor or a generator or any electrical machine or device in which one member is annular and another member is movable within the annular member and a magnetic field exists between the two members to cause relative movement therebetween.

If the members involved are those of an electric motor, as illustrated in the drawings, the stator windings 203 are energized. The rotor 204 may be permitted to rotate as a result of energization of the stator windings 203 or the rotor 204 may remain stationary during the alignment operation. If the rotor 204 is not properly magnetically centered within the stator 202, forces are created upon one or more of the force sensing devices 48, 50, 52 and 54. The force sensing devices 48, 50, 52 and 54 provide signals to the instruments 162, 164, 166 and 168, respectively. Thus the location of the forces sensed are indicated. Thus, the instrument 162 indicates that a force is sensed by the force sensing device 48, and the instrument 164 indicates that a force is sensed by the force sensing device 50, etc.

Due to the fact that the force sensing devices 50 and 52 are adjacent the arms 70 and 92, the position of one or both of the arms 70 and 92 is adjusted to change the forces sensed by the force sensing devices 50 and 52. Likewise, due to the fact, that the force sensing devices 48 and 54 are adjacent the arms 74 and 128, the position of one or both of the arms 74 and 128 is adjusted to change the forces sensed by the force sensing devices 48 and 54. Of course, it is to be understood, for example, that adjustment of the arm 74 and/or 128 may have a minor affect upon the forces sensed by the sensing devices 50 and 52, as well as upon the forces sensed by the sensing devices 48 and 54.

Figure 7:
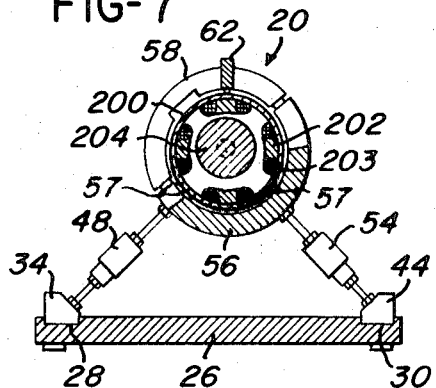
FIG. 7 is a diagrammatic type of sectional view of the alignment apparatus, drawn on substantially the same scale as FIG. 1, illustrating a given position of a rotor with respect to a stator.

If, for example, the rotor 204 is closer to the upper part of the stator 202 than to the lower part thereof, as illustrated in FIG. 7, such condition may be sensed by all of the sensing devices 48, 50, 52, and 54. The position of the arm 70 is adjusted by adjustment of the micrometer adjustment device 80. The position of the arm 92 is adjusted by adjustment of the micrometer adjustment device 96. Adjustment of the arm 70 and/or the arm 92 causes movement of the clamp 140 and thus causes movement of the end bell 212, and thus causes movement of the rotor 204 with respect to the stator 202, particularly with respect to the right hand portion of the rotor 204 and the stator 202, as viewed in FIG. 2. Likewise, the position of the arm 74 is adjusted by adjustment of the micrometer adjustment device 116, and the position of the arm 128 is adjusted by adjustment of the micrometer adjustment device 134.

Figure 8:
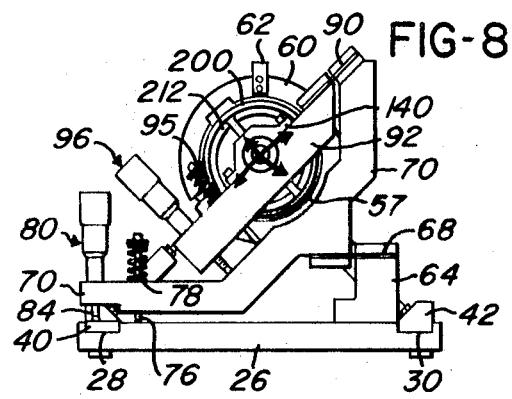
FIG. 8 is a diagrammatic type of plan view illustrating adjustment of the rotor with respect to the stator, the adjustment being about two pivotal axes of the support members.
Figure 9:
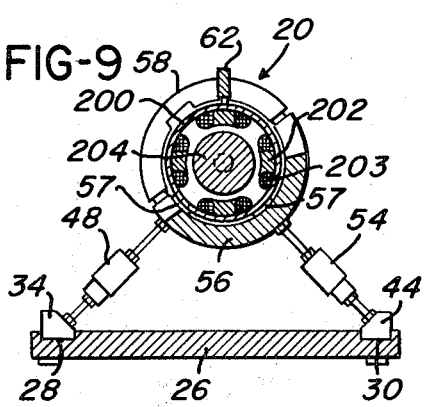
FIG. 9 is a diagrammatic type of sectional view illustrating a different position of the rotor with respect to the stator.
Figure 10:
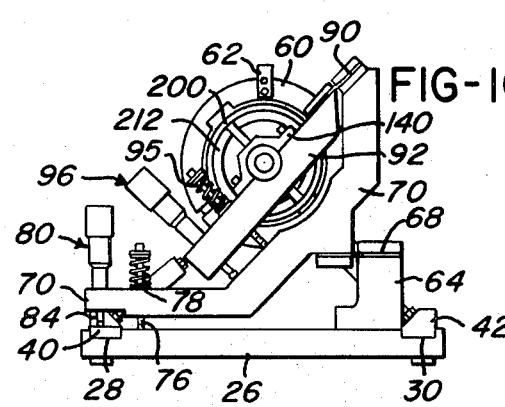
FIG. 10 is a diagrammatic type of plan view, similar to FIG. 8, illustrating adjustment of the rotor with respect to the stator, the adjustment being about a single axis.

FIG. 8 illustrates adjustment of the arms 70 and 92. It is to be noted that each arm 70 and 92 pivotally moves substantially at right angles with respect to the other arm.

FIG. 11

Figure 11:
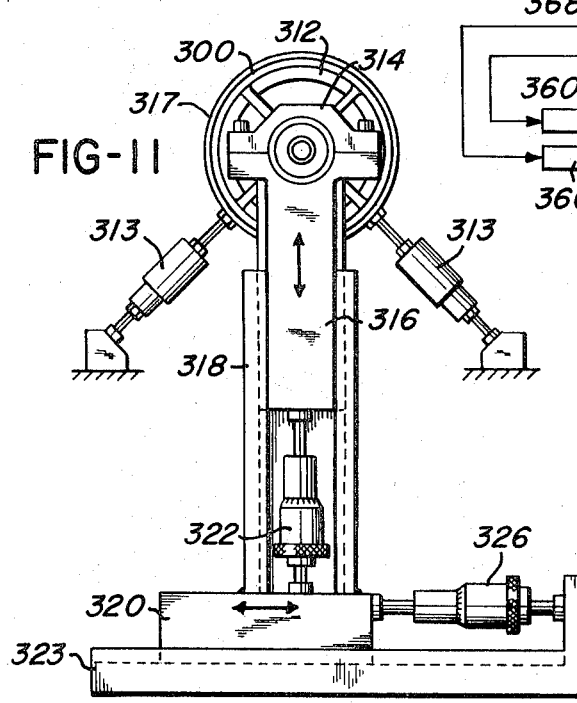
FIG. 11 is a diagrammatic type of view showing another embodiment of a portion of the apparatus of this invention.

The adjustment of the arms 70, 92, 74 and 128 is shown as being pivotal. However, the structure which supports the end bells 210 and 212 may be such as to provide straight line movement thereof during adjustment thereof. For example, FIG. 11 shows a housing 300, which may be similar to the housing 200, and an end bell 312 which may be similar to the end bell 212. Force sensing devices 313, which may be similar to the force sensing devices 48, 50, 52 and 54, are joined to a band 317 which encompasses the housing 300, for sensing the forces exerted thereby during the alignment procedure. The end bell 312 is supported by a clamp 314, which is attached to a vertically movable support member 316. The vertically movable support member 316 is movably supported by a vertically extending post 318, which is secured to a horizontally movable support member 320. An adjustment device 322 is positioned between the vertically movable support member 316 and the horizotally movable support member 320 and is attached thereto. The adjustment device 322 is operable to cause up or down movement of the vertically movable support member 316.

The horizontally movable support member 320 is movable upon a fixed support base 323 which is provided with an end portion 324. An adjustment member 326 is positioned between the end portion 324 and the horizontally movable support member 320 and is operable to move the horizontally movable support member 320 toward and away from the end portion 324. Thus, movement of the vertically movable support member 316 moves the end bell 312 and the rotor (not shown), supported thereby, up or down. Movement of the horizontally movable support member 320 causes horizontal movement of the end bell 312. A unit similar to that shown in FIG. 11 is positioned at the other end of the housing 300 for adjustment of an end bell which assists in supporting the rotor which is also supported by the end bell 312.

FIG. 12

Figure 12:
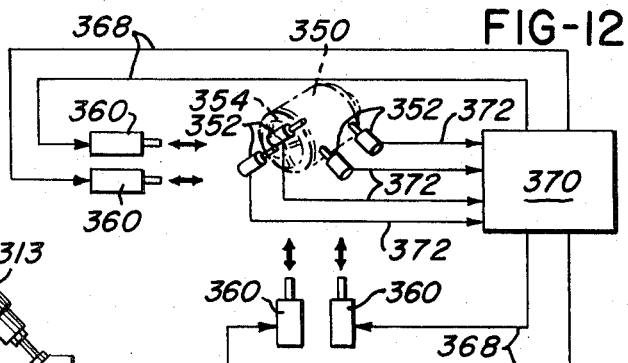
FIG. 12 is a diagrammatic type of view showing another embodiment of a portion of the apparatus of this invention.

FIG. 12 shows diagrammatically a stator 350, which has a plurality of force sensing devices 352 in engagement therewith. A rotor, not shown, is rotatable therewithin and has end bells 354, one of which is shown. The end bells 354 are supported by any suitable adjustable support means, not shown, for adjustment of the position of the end bells 354 with respect to the stator 350. The adjustable support means may be of the type shown in FIGS. 1 – 10, comprising pivotal support members, or the adjustable support means may be of the type shown in FIG. 11, comprising support members having straight line movement or the adjustable support means may be of any other suitable type.

Adjustment members 360 are shown for adjustment of the support means.

The adjustment members 360 include motor means for operation thereof and are joined by conductor members 368 to a control unit 370. Conductor members 372 join the force sensing devices 352 to the control unit 370. Thus, the control unit 370 receives signals from the individual force sensing devices 352 with regard to the forces sensed thereby. In response, the control unit 370 causes signals to be transmitted to the individual adjustment members 360 for operation thereof in accordance with the forces sensed by the individual force sensing devices 352. Thus, adjustment of the end bells 354 and the rotor carried thereby is performed automatically for obtaining the proper relative magnetic position between the rotor and the stator. In this manner, the adjustment devices 80, 96, 116 and 134 of FIGS. 1 – 10 and/or for the adjustment devices 322 and 326 of FIG. 11 may be motor operated in an automatic adjustment system. Thus, adjustment of a rotor with respect to an encompassing stator may be performed automatically.

It is to be understood that the instruments 162, 164, 166 and 168 indicate that the respective sensing devices 48, 50, 52 and 54 are sensing forces applied thereto. It is also to be understood that these instruments indicate the magnitude of the forces applied to these sensing devices. The magnitude of the forces applied to these sensing devices is related to the voltage of the electrical energy applied to the winding 203 of the stator 202 when the rotor is not magnetically centered within the stator 202.

A technique which has been found advantageous in an alignment operation is that of pulsatingly changing the magnitude of the voltage applied to the stator winding 203. When the rotor 204 is not magnetically aligned within the stator 202, the magnitude of the forces appearing upon one or more of the indicator instruments 162, 164, 166 and 168 pulsates in synchronism with the pulsating voltage applied to the stator winding 203. Thus, while a voltage of pulsating magnitude is applied to the stator winding 203, so long as pulsating indications appear in any of the instruments 162, 164, 166 and 168, the rotor 204 is not magnetically aligned within the stator 202. As the alignment operation occurs, the magnitude of the pulsations indicated by the indicator instruments 162, 164, 166 and 168 decreases, because the magnetic forces acting between the rotor 204 and the stator 202 increasingly balance each other.

When the magnetic alignment is attained, the readings of the indicator instruments cease to pulsate, even though the voltage applied to the stator winding 203 continues to pulsate. Only the steady state forces resulting from the weight of the stator and yoke members remain to act upon the sensing devices 48, 50, 52 and 54.

This procedure eliminates the need for adjusting the indicating instruments to read zero prior to commencing the alignment process. Thus, adjustment of the instruments to compensate for the weight of the stator upon the sensing devices is not necessary when this technique of applying a voltage of pulsating values to the stator is employed. This procedure may also be advantageous in regard to some types of electrical apparatus and may permit an alignment operation to be performed more rapidly and more accurately than a procedure in which the voltage applied to the stator winding 203 is substantially constant in magnitude.

It is to be understood that in accordance with this invention, a rotor may be moved with respect to a stator, or a stator may be moved with respect to a rotor, or both a stator and a rotor may be moved for obtaining magnetic centering between a rotor and a stator.

Figure 13:
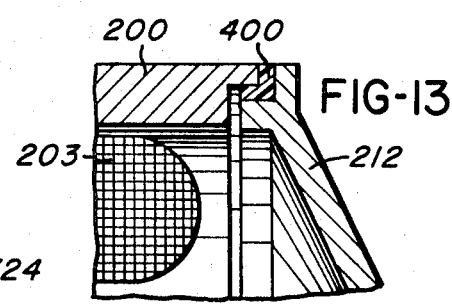
FIG. 13 is a fragmentary sectional view, drawn on a larger scale than FIG. 2 and showing a means of attachment of an end bell to a housing following an alignment procedure of this invention.

After the magnetic centering operation has been accomplished, the end bells which support the rotor or movable member, such as the end bells 210 and 212, are secured to the housing 200 by any suitable means to secure the rotor 204 in the magnetic center within the stator 202. For example, as shown in FIG. 13, a suitable plastics material 400 or epoxy or the like is used to attach the end bells 212 to the housing 200. The plastics material is preferably one which is applied as a flowable material but which hardens in the atmosphere. However, other methods of attachment, such as the use of other attachment materials, or bolts, screws and the like may be employed.

Although the preferred embodiment of the device has been described, it will be understood that within the purview of this invention, various changes may be made in the form, details, proportion and arrangement of parts, the combination thereof and mode of operation, which generally stated consist in a device capable of carrying out the objects set forth, as disclosed and defined in the appended claims.

The invention having thus been described, the following is claimed:

1. The method of magnetically centering a movable member within an annular stator member, in which both members are elements of electrical apparatus in which the movable member is normally movable within the annular stator member as a result of a magnetic field established within the apparatus, comprising: positioning the movable member within the annular stator member, applying electrical energy to one of the members causing forces to be created substantially at right angles to the axis of normal movement of the movable member when the movable member and the stator member do not have the same magnetic center,
sensing forces exerted by at least one of the members which are substantially at right angles to the axis of normal movement of the movable member,
moving at least one of the members in a direction which is substantially at right angles to the axis of normal movement of the movable member to reduce to a minimum the forces which are substantially at right angles to the axis of normal movement of the movable member.

2. The method of claim 1 in which electrical energy is applied to the stator member.

3. The method of claim 1 in which the movable member is moved in a direction which is substantially normal to the axis of normal movement thereof.

4. The method of claim 1 in which forces which are exerted by the stator member are sensed.

5. The method of claim 4 in which forces which are exerted by a plurality of portions of the stator member are sensed.

6. The method of claim 1 in which the voltage of the electrical energy is applied alternatingly at a lesser magnitude and then at a greater magnitude so that the forces sensed also alternatingly change when the movable member is not magnetically centered within the annular stator member.

7. The method of claim 1 in which the movable member moves in its normal manner of movement under the influence of the applied electrical energy as the forces are sensed which are substantially normal to the axis of normal movement of the movable member.

8. The method of magnetically centering a rotor member of an electrical machine within an annular stator member thereof, comprising:
positioning the rotor member within the stator member,
applying electrical energy to the stator member causing forces to be created substantially at right angles to the axis of normal movement of the rotor member when the rotor member and the stator member do not have the same magnetic center,
sensing the lateral forces exerted by one of the members,
relatively positioning the members to reduce to a minimum the lateral forces existing between the members.

9. The method of claim 8 in which the lateral forces which are exerted by the stator are sensed.

10. A method of assembling an electrical machine which has a rotor and an annular stator, comprising the steps of:
positioning the rotor within the stator,
applying electrical energy to the stator causing forces to be created substantially at right angles to the axis of normal movement of the rotor when the rotor and the stator do not have the same magnetic center,
sensing the lateral magnetic forces exerted between the stator and the rotor,
relatively positioning the rotor and stator for minimizing the lateral magnetic forces,
securing the relative positions of the rotor and stator after the lateral magnetic forces are minimized.

* * * * *